(12) United States Patent
Wernersson et al.

(10) Patent No.: US 9,236,916 B2
(45) Date of Patent: Jan. 12, 2016

(54) NODE AND METHOD FOR GENERATING BEAMFORMED FOR DOWNLINK COMMUNICATIONS

(75) Inventors: Niklas Wernersson, Solna (SE); David Hammarwall, Vallentuna (SE); Svante Bergman, Hägersten (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 446 days.

(21) Appl. No.: 13/636,780

(22) PCT Filed: Sep. 13, 2012

(86) PCT No.: PCT/SE2012/050965
§ 371 (c)(1),
(2), (4) Date: Sep. 24, 2012

(87) PCT Pub. No.: WO2013/137794
PCT Pub. Date: Sep. 19, 2013

(65) Prior Publication Data
US 2013/0242773 A1    Sep. 19, 2013

Related U.S. Application Data

(60) Provisional application No. 61/611,149, filed on Mar. 15, 2012.

(51) Int. Cl.
*H04W 72/06* (2009.01)
*H04W 72/08* (2009.01)
(Continued)

(52) U.S. Cl.
CPC ............... *H04B 7/024* (2013.01); *H04B 7/063* (2013.01); *H04B 7/0617* (2013.01);
(Continued)

(58) Field of Classification Search
None
See application file for complete search history.

(56) References Cited

U.S. PATENT DOCUMENTS

| 2009/0005120 A1* | 1/2009 | Ylitalo ....................... 455/562.1 |
| 2009/0253387 A1* | 10/2009 | Van Rensburg et al. ..... 455/90.2 |
| 2010/0075705 A1* | 3/2010 | van Rensburg et al. ...... 455/509 |

FOREIGN PATENT DOCUMENTS

| WO | WO 2006/026890 | 3/2006 |
| WO | WO 2006/026890 A1 | 3/2006 |

(Continued)

OTHER PUBLICATIONS

IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks, IEEE Standard, IEEE, Oct. 12, 2009, XP017604237.

(Continued)

*Primary Examiner* — Omar Ghowrwal
(74) *Attorney, Agent, or Firm* — Patent on Demand, P.A.; Brian K. Buchheit; Scott M. Garrett

(57) ABSTRACT

Example embodiments presented herein are directed towards an eNodeB, and method therein, for generating downlink communications in a multiple antenna system. The method comprises transmitting, to a number of user equipments, a plurality of reference signals, where each signal is beamformed in a distinct direction within at least one correlated domain (e.g., elevation and/or azimuth). The eNodeB receives at least one CSI report from a specific user equipment and determines a primary reference signal based on, for example, the at least one CSI report. The eNodeB may thereafter generate downlink communication signals for antenna element(s) and/or subelements of the multiple antenna system. The downlink communication signals are beamformed into a transmitting direction that aligns most closely with a beamforming direction of the at least one primary reference signal, as compared to any other beamforming direction of the reference signals.

30 Claims, 11 Drawing Sheets

(51) Int. Cl.
- *H04B 7/02* (2006.01)
- *H04B 7/06* (2006.01)
- *H04L 5/00* (2006.01)
- *H04B 7/10* (2006.01)
- *H04B 17/24* (2015.01)

(52) U.S. Cl.
CPC ........... *H04B 7/0619* (2013.01); *H04B 7/0626* (2013.01); *H04B 7/0632* (2013.01); *H04B 7/0639* (2013.01); *H04W 72/06* (2013.01); *H04B 7/10* (2013.01); *H04B 17/24* (2015.01); *H04L 5/0023* (2013.01)

(56) References Cited

FOREIGN PATENT DOCUMENTS

| | | |
|---|---|---|
| WO | WO 2010/150129 | 12/2010 |
| WO | WO 2010/150129 A2 | 12/2010 |

OTHER PUBLICATIONS

3GPP TR 36.819, 3rd Generation Partnership Project; Technical Specification Group Radio Access Network; Coordinated Multi-point Operation for LTE Physical Layer Aspects (Release 11), V11.10, Dec. 2011.

International Search Report issued in Application Serial No. PCT/SE2012/050965 dated Dec. 21, 2012.

Written Opinion issued in Application Serial No. PCT/SE2012/050965 dated Dec. 21, 2012.

Amendment 2: Millimeter-Wave-Based Alternative Phy Extension; IEEE; Std 802.15.3c-2009 (XP 17604237), 2009.

3GPP TR 36.819 v11.1.0 (Dec. 2011); 3rd Generation Partnership Project; Technical Specification Group Radio Access Network; Coordinated multi-point operation for LTE physical layer aspects (Release 11), 2011.

* cited by examiner

NODE AND METHOD FOR GENERATING BEAMFORMED FOR DOWNLINK COMMUNICATIONS

This application is the U.S. national phase of International Application No. PCT/SE2012/050965 filed 13 Sep. 2012 which designated the U.S. and claims priority to U.S. Provisional Application No. 61/611,149 filed 15 Mar. 2012, the entire contents of each of which are hereby incorporated by reference.

TECHNICAL FIELD

Example embodiments presented herein are directed towards generating beamformed for downlink communications in a multiple antenna system.

BACKGROUND

Overview of Multi-Antenna Systems

Multi-antenna techniques may be used to significantly increase the data rates and reliability of a wireless communication system. System performance may in particular be improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. For instance there is LTE-Advanced support for a spatial multiplexing mode with the possibly channel dependent precoding. Precoding is a form of beamforming to support multi-layer transmission in multi-antenna wireless communications. Beamforming is a signal processing technique used with antenna arrays for directional signal transmission or reception.

Spatial multiplexing is transmission techniques in MIMO wireless communications to transmit independent and separately encoded data signals from each of the multiple transmit antennas. The spatial multiplexing mode is aimed for high data rates in favorable channel conditions. An illustration of the spatial multiplexing operation is provided in FIG. 1.

As seen FIG. 1, the information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by:

$$y_n = H_n W_{N_T \times r} s_n + e_n$$

where $e_n$ is a noise/interference vector obtained as realizations of a random process. The precoder, $W_{N_T \times r}$, may be a wideband precoder, which is constant over frequency, or frequency selective. Note that the signals above (e.g., $y_n$) could alternatively represent a signal in the time-domain. It is generally understood that signals described herein may represent signals in other domains than in the time-frequency grid of an OFDM system.

The precoder matrix is often chosen to match the characteristics of the $N_R \times N_T$ MIMO channel matrix H, resulting in so-called channel dependent precoding. This is also commonly referred to as closed-loop precoding and generally strives for focusing the transmit energy into a subspace which is strong in the sense of conveying much of the transmitted energy to the user equipment. In addition, the precoder matrix may also be selected to strive for orthogonalizing the channel, meaning that after proper linear equalization at the user equipment the inter-layer interference is reduced.

In closed-loop precoding for the LTE downlink, the user equipment transmits, based on channel measurements in the forward link (downlink), recommendations to the eNodeB of a suitable precoder to use. The user equipment selects a precoder out of a countable and finite set of precoder alternatives, referred to as a precoder codebook. A single precoder that is supposed to cover a large bandwidth (wideband precoding) may be fed back. It may also be beneficial to match the frequency variations of the channel and feedback a frequency-selective precoding report, e.g., several precoders, one per sub-band. This is an example of the more general case of channel state information (CSI) feedback, which also encompasses feeding back other entities than precoders to assist the eNodeB in subsequent transmissions to the user equipment. Such other information may comprise channel quality indicators (CQIs) as well as a transmission rank indicator (RI). For the LTE uplink, the use of closed-loop precoding means the eNodeB is selecting precoder(s) and transmission rank and thereafter signals the selected precoder that the user equipment is supposed to use.

SUMMARY

Active antennas may comprise many subelements and arrays of active antennas may comprise even more. Such antenna configurations were neither thought of, nor taken into account, when existing codebooks where designed. Thus, at least one example object of the example embodiments presented herein is to provide spatial multiplexing transmission techniques in MIMO wireless communications which account for the various subelements which may be comprised in active antenna arrays. Some of the example embodiments are also directed providing improved data communications which may provide beamformers with improved link adaptation, modulation, precoding, and transmission rank of the multiple antenna system. It should be appreciated that the example embodiments presented herein may also be applied without the use of spatial multiplexing, in which case only elevation beamforming may be utilized. Furthermore, according to some of the example embodiments, spatial multiplexing may be utilized where beamforming may be provided in only the azimuth direction. According to other example embodiments, beamforming may be provided in both an azimuth and elevation domain.

Accordingly, some of the example embodiments may be directed towards a method, in an eNodeB, for generating downlink communications in a multiple antenna system. The eNodeB is comprised in a wireless communications network. The method comprises transmitting, to a plurality of user equipments, a plurality of reference signals. Each reference signal is beamformed into a distinct direction within at least one correlated domain of the multiple antenna system. The method further comprises receiving, from a specific user equipment, at least one Channel State Information (CSI) report for at least a subset of reference signals of said plurality of transmitted reference signals. The method also comprises determining at least one primary reference signal among said first set of reference signals. The method further comprises generating downlink communication signals for antenna element(s) and/or sub-elements of the multiple antenna system. The downlink communication signals are beamformed into a transmitting direction that aligns most closely with a beamforming direction of the at least one primary reference signal, as compared to any other beamforming direction of reference signals comprised in the first set of reference signals.

Some of the example embodiments may be directed towards an eNodeB, for generating downlink communications in a multiple antenna system. The eNodeB is comprised in a wireless communications network. The eNodeB comprises radio circuitry configured to transmit, to a plurality of user equipments, a plurality of reference signals. Each reference signal is beamformed into a distinct direction within at least one correlated domain of the multiple antenna system. The radio circuitry is further configured to receive, from a specific user equipment, at least one CSI report for at least a subset of reference signals of said plurality of transmitted reference signals. The eNodeB further comprises processing circuitry configured to determine at least one primary reference signal among said first set of reference signals. The processing circuitry is further configured to generate downlink communication signals for antenna element(s) and/or sub-elements of the multiple antenna system. The downlink communication signals are beamformed into a beamforming direction of the at least one primary reference signal, as compared to any other beamforming direction of reference signals comprised in the first set of reference signals.

Some of the example embodiments may be directed towards a method in a user equipment, for establishing beamforming for a multiple antenna system. The user equipment is comprised in a wireless communications network. The method comprises receiving, from an eNodeB, a plurality of reference signals. Each reference signal is beamformed into a distinct direction within at least one correlated domain of the multiple antenna system. The method further comprises measuring a corresponding effective channel for, at least a subset, of the plurality of reference signals. The method also comprises determining a recommended effective channel, among the effective channels, based on a performance metric relating to a performance of a data transmission over a given effective channel. The method also comprises transmitting, to a wireless communication network, an index identifying the recommended effective channel.

Some of the example embodiments may be directed towards a user equipment, for establishing beamforming for a multiple antenna system. The user equipment is comprised in a wireless communications network. The user equipment comprises radio circuitry configured to receive, from an eNodeB, a plurality of reference signals. Each reference signal is beamformed into a distinct direction within at least one correlated domain of the multiple antenna system. The user equipment also comprises processing circuitry configured to measure a corresponding effective channel for, at least a subset, of the plurality of reference signals. The processing circuitry further configured to determine a recommended effective channel, among the effective channels, based on a performance metric relating to a performance of a data transmission over a given effective channel. The radio circuitry is further configured to transmit, to a wireless communication network, an index identifying the recommended effective channel.

An example advantage of some of the example embodiments presented herein is that the CSI feedback from the user equipment may be significantly better aligned with the elevation beamformer used for the data transmission, thereby increasing the performance in terms of spectral efficiency and robustness.

DEFINITIONS

3GPP 3rd Generation Partnership Project
CoMP Coordinated Multi Point
CRS Common Reference Symbols
CSI Channel State Information
CQI Channel Quality Indicator
DFT Discrete Fourier Transform
DL Downlink
eNB Evolve Node B
EPRE Energy Per Resource Element
FDD Frequency Division Duplexing
GSM Global System for Mobile communications
LTE Long Term Evolution
MIMO Multiple Input Multiple Output
OFDM Orthogonal Frequency-Division Multiplexing
PUSCH Physical Uplink Shared Channel
PMI Precoder Matrix Indicator
RAN Radio Access Network
RF Radio Frequency
RI Rank Indicator
RRC Radio Resource Control
RS Reference Signal
RSRP Reference Signal Received Power
RSRQ Reference Signal Received Quality
RSSI Received Signal Strength Indicator
Rx Receive
TFRE Time/Frequency Resource Element
Tx Transmit
UMB Ultra-Mobile Broadband
UE User Equipment
UL Uplink
WCDMA Wideband Code Division Multiple Access
WiMax Worldwide Interoperability for Microwave Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
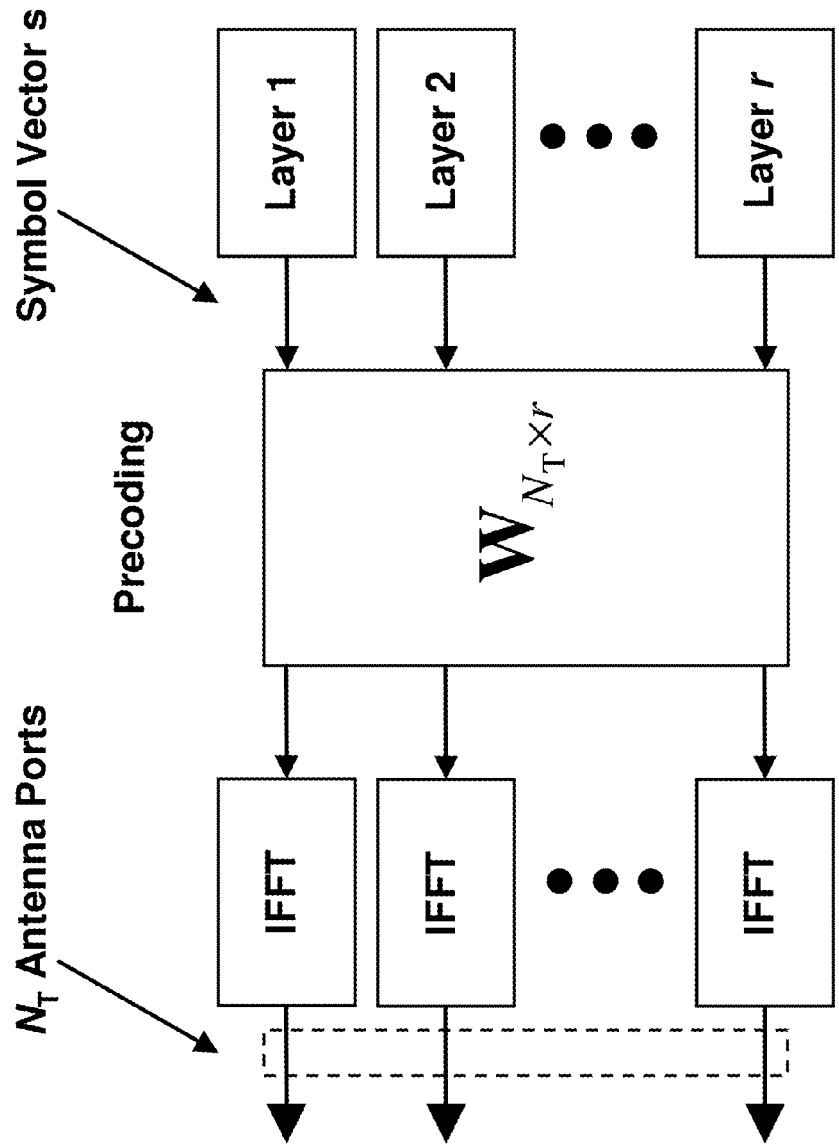
FIG. 1 is an illustration of a transmission structure for a precoded spatial multiplexing mode in LTE.

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Some of the example embodiments presented herein are directed towards providing user equipment specific beamforming for downlink communications. As part of the development of the example embodiments presented herein, a problem will first be identified and discussed. The description below is organized as follows.

First, examples of existing precoders will be briefly discussed under the subheading "Examples of Existing Precoder Codebooks for LTE". Thereafter, an introduction on reference symbols which a user equipment may utilize for precoder determination is provided under the subheading "Channel State Information Reference Symbols (CSI-RS)". Afterwards an introduction of CoMP transmission is provided under the subheading "Coordinated Multipoint Transmission". CoMP feedback may be used by the user equipment to send signal quality measurements to the eNodeB. The eNodeB may in-turn provide the downlink communications based on, at least in part, these measurements, according to some of the example embodiments. Thereafter, an introduction to antenna arrays and active antennas is provided under the subheadings "Antenna Arrays" and "Active Antennas", respectively. Afterwards, a detailed analysis of some of the example embodiments will be provided.

Examples of Existing Precoder Codebooks for LTE

2 Tx Codebook

LTE Release-8, the first release of LTE, features the support codebook based precoding for 2 antennas. Up to two layers can be transmitted (rank 1 and rank 2), thus making the precoder matrix $W_{2 \times r}$ of dimension 2×1 and 2×2, respectively.

8 Tx Codebook

LTE Release-10, and later specifications, support a transmission mode for up to 8-layer spatial multiplexing for 8 Tx antennas using user equipment specific RS. Rank adaptation and possibly channel dependent precoding is also supported. User equipment specific RS is used for demodulation purposes and because of that the eNodeB is free to use whatever precoder(s) it wants to, but it may be assisted in the determination of precoder(s) via CSI feedback from the user equipment that includes recommended precoder(s). For the time-frequency resource of interest, the user equipment selects a precoder $W_{8 \times r}$ out of a set of possible precoders in a precoder codebook which then is used together with an input symbol vector $s_{r \times 1}$ to produce an output signal $x_{8 \times 1} = W_{8 \times r} s_{r \times 1}$ for r layers.

Channel State Information Reference Symbols (CSI-RS)

In LTE Release-10, a new reference symbol sequence was introduced with the intent of estimating channel state information, the CSI-RS. The CSI-RS provides several advantages over basing the CSI feedback on the common reference symbols (CRS) which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resources to measure on may be configured in a user equipment specific manner). Moreover, the support of antenna configurations larger than 4 antennas should resort to CSI-RS, since the CRS is only defined for at most 4 antennas.

Based on the CSI-RS, the user equipment may estimate the channel and consequently also figure out which precoder suits the particular channel. For the purpose of CSI feedback determination, the user equipment assumes that each of the rows corresponds to an antenna port (ports 15-22) on which a CSI-RS port signal is transmitted. The first row represents antenna port 15, the second row represents antenna port 16, and so on. Each CSI-RS port signal is typically transmitted from an antenna of its own, meaning that there is a direct correspondence between a CSI-RS port and a physical antenna.

Coordinated Multipoint Transmission

Coordinated Multi Point (CoMP) transmission and reception refers to a system where the transmission and/or reception at multiple, geographically separated antenna sites is coordinated in order to improve system performance. The coordination can either be distributed, by means of direct communication between the different sites, or by means of a central coordinating node.

CoMP is a tool introduced in LTE to improve the coverage of high data rates, the cell-edge throughput and/or to increase system throughput. In particular, the goal is to distribute the user perceived performance more evenly in the network by taking control of the inter-cell interference.

CSI-RS Received Power

In order to enable efficient CoMP schemes, new forms of CSI feedback are potentially needed. For instance it is an agreed working assumption, for LTE Rel-11, that the network can configure a user equipment to report signal qualities (e.g., received signal powers) based on measurements on a configured set of CSI-RS resources. A CSI-RS resource may loosely be described as the pattern of resource elements on which a particular CSI-RS configuration is transmitted. A CSI-RS resource may be configured through RRC signaling.

Such a measurement could be done coherently, in which case the user equipment needs to know the CSI-RS sequence that is transmitted on the CSI-RS resource, or incoherently in which case the transmitted actual sequence can be transparent to a user equipment. It should be appreciated that herein any signal quality measure based on measurements on CSI-RS resources is referred to as "CSI-RS received power" (CSI-RSRP), but it should be understood that CSI-RSRP encompasses any quantity that represents a received quality of a CSI-RS signal. The estimated values of the CSI-RSRP may then be fed back from the user equipment to the eNodeB.

Antenna Arrays

Figure 2:
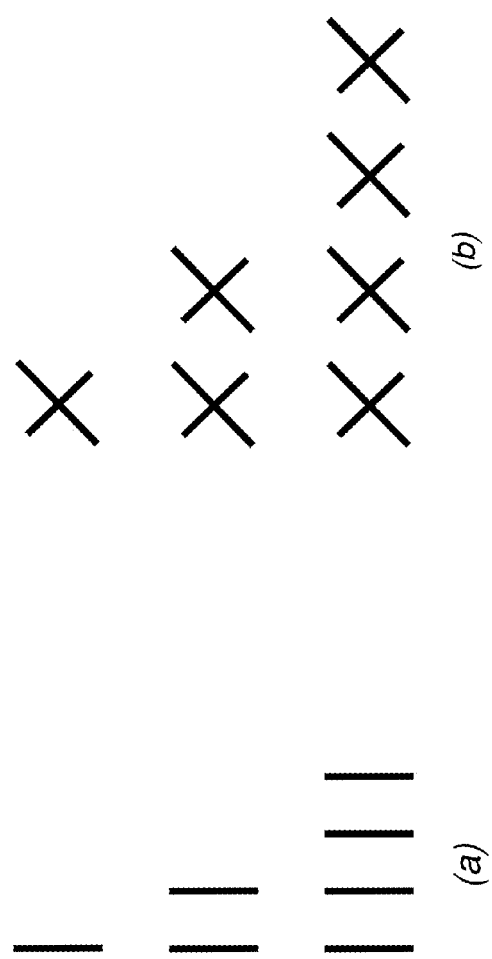
FIG. 2A is an example illustration of a co-polarized antenna configuration.
FIG. 2B is an example illustration of a cross-polarized antenna configuration.

On the network side, base stations are often equipped with multiple antennas to be used for reception and transmission. The antennas intended for a transmission point (e.g., a cell, and/or a sector), form a so-called antenna array. Some typical antenna array constellations are illustrated in FIG. 2. For instance, one common antenna array layout is to use co-polarized antennas in order to construct antenna arrays as shown in FIG. 2(a). Furthermore, another common layout is to instead use cross-polarized antennas as shown in FIG. 2(b).

Figure 3:
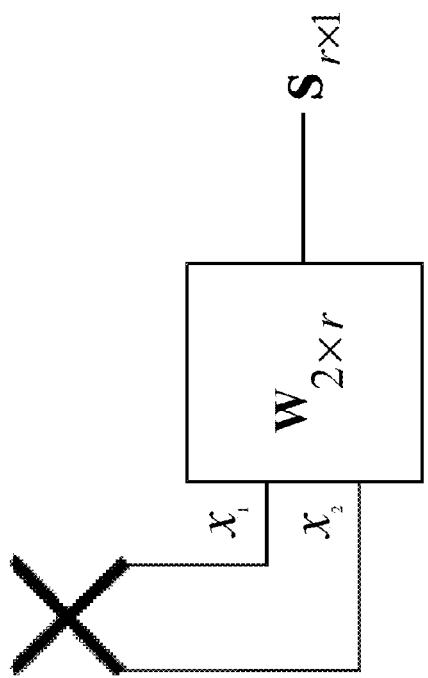
FIG. 3 is a depiction of codebook based precoding with a 2 Tx cross-polarized antenna array.

Using, for example, a 2 Tx cross-polarized antenna array (c.f. the top most antenna setup in FIG. 2(b)) implies that the antenna array is fed with two signals, $x_1$ and $x_2$. This is illustrated in FIG. 3 where it has been assumed that a 2 Tx antenna array is used with codebook based precoding, so that the transmitted signal is $x_{2\times 1} = W_{2\times r} s_{r\times 1}$.

Active Antennas

Figure 4:
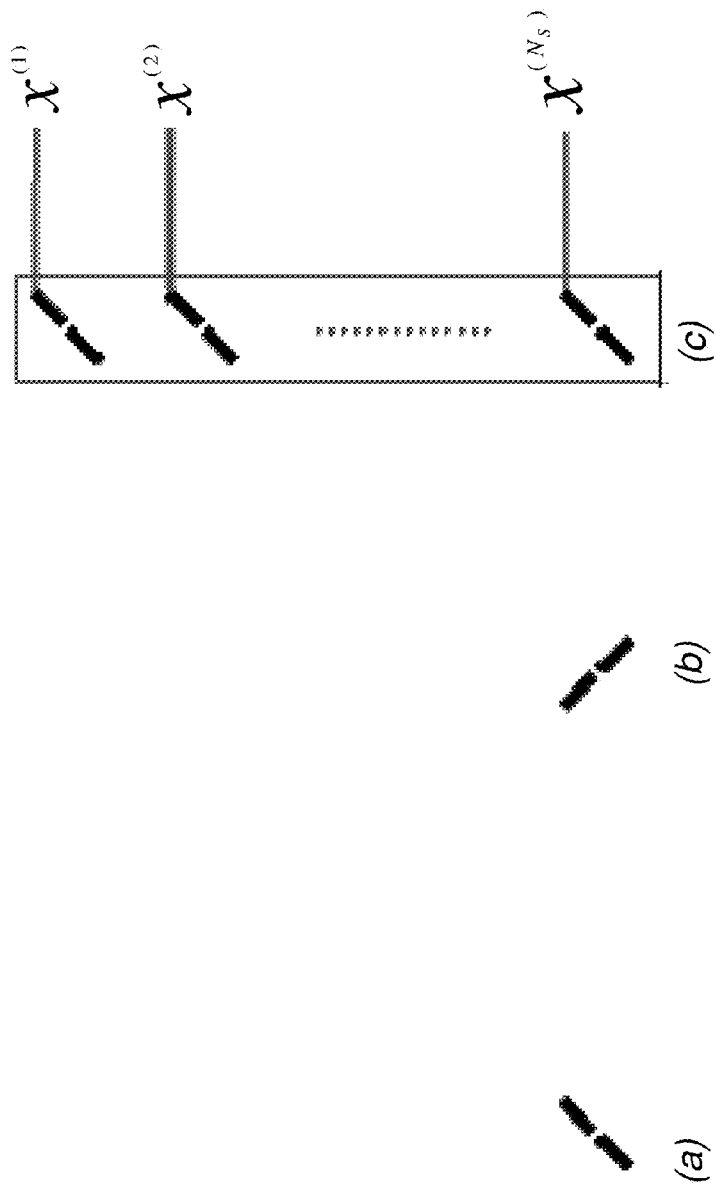
FIG. 4A is an illustration of an antenna subelement.
FIG. 4B is an illustration of an antenna subelement featuring orthogonal polarization compared to the subelement of FIG. 4A.
FIG. 4C is an illustration of an active antenna array.

An active antenna comprises a number of subelements that jointly form the antenna. In FIG. 4(a) a subelement, in practice may be realized by a small physical device, as is illustrated. Each subelement will have a polarization direction which potentially can be orthogonal to another subelement's polarization. This is illustrated in FIG. 4(b) where a subelement with orthogonal polarization compared to the subelement in FIG. 4(a) is shown. Finally, in FIG. 4(c) an active antenna array which consists of $N_S$ subelements is shown. In general, but not necessarily, all the subelements of an active antenna are of the same polarization. Note that each given subelement i can be fed the given signal $x^{(i)}$ not necessarily equal to $x^{(j)}$.

Herein, when dealing with more than one active antenna, the notation $x_i^{(j)}$ will be utilized when referring to a signal, or function, related to the j:th subelement in the i:th antenna. These indexes will however be omitted when it is clear from the context what is being referred.

By combining two active antennas of different polarizations, as illustrated in FIG. 5(a), a 2 Tx antenna array may be created and fed with two different signals, $x_1$ and $x_2$ where $x_i = [x_i^{(1)} \ldots x_i^{(N_S)}]^T$. Furthermore, by combining multiple 2 Tx antenna arrays, as illustrated in FIG. 5(b), an 8 Tx antenna array may be created. Here the signals $x_i^{(j)}$ are no longer explicitly shown but they are still assumed to be present in the same manner as in FIG. 5(a).

Existing precoder codebooks in different standards have been designed for conventional antenna arrays. For example, in LTE Release 10 and beyond, precoder codebooks for 2, 4 or 8 Tx antennas are supported. There is thus a precoder codebook suitable for each antenna array type. Hence, when using, for example, a 2 Tx antenna array, the standard is designed to use the 2 Tx codebook meaning that $x_1$ and $x_2$ can be fed to the antenna array just as in FIG. 3.

Figure 5:
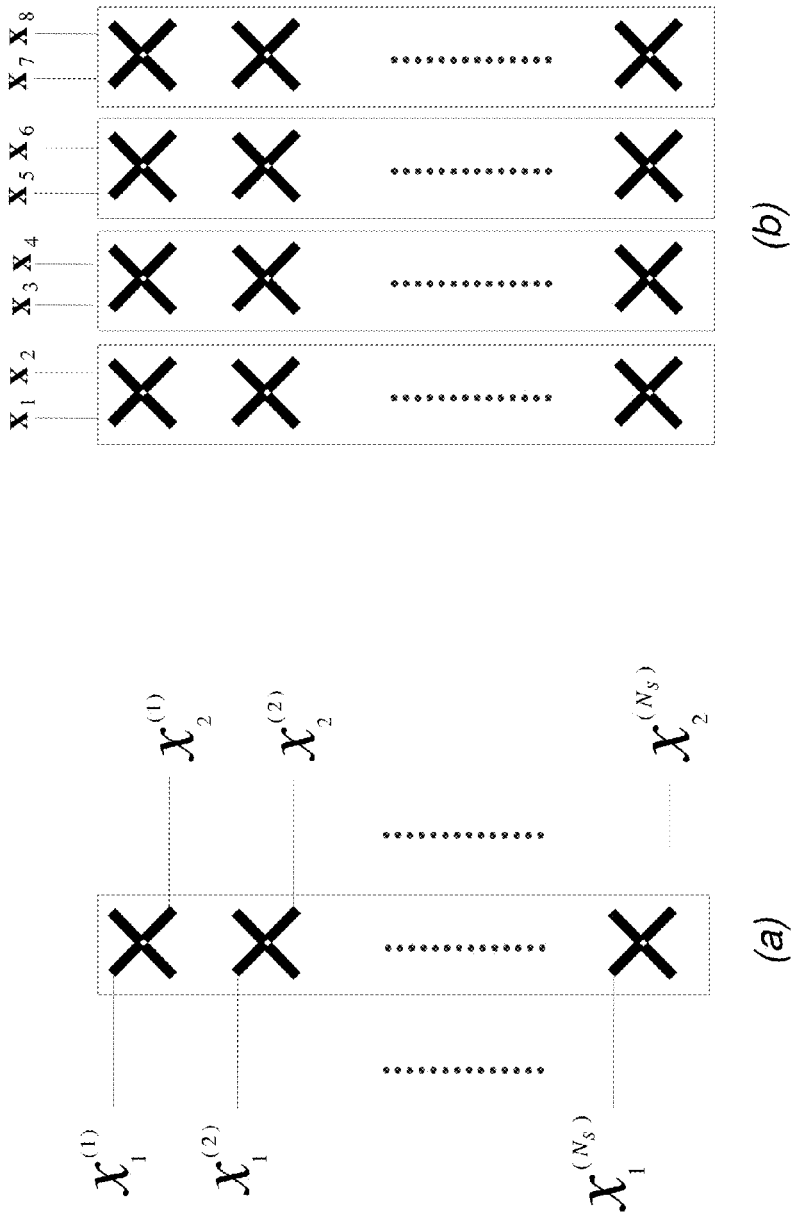
FIG. 5A is an illustration of a 2 Tx active antenna array.
FIG. 5B is an illustration of a 8 Tx active antenna array.

Active antennas comprise many subelements and arrays of active antennas comprise even more. Such antenna setups were neither thought of, nor taken into account, when the existing codebooks were designed. Therefore, existing codebooks do not utilize the fact that the subelements can be accessed as illustrated in FIG. 5.

Moreover, for large active antenna deployments, the sheer number of sub-element antenna ports can create so many degrees of freedom that the CSI feedback overhead from a user equipment becomes prohibitive.

Active antennas, antenna arrays and arrays of active antennas may be generalized to a system of multiple antennas. Herein, the phrase multiple antenna system is used to describe a set of antennas (comprising one active antenna with multiple sub-elements) that constitutes a transmission point (i.e., with the intent to serve a sufficiently isolated region of space, such as a cell and/or sector).

Overview of Beamforming According to the Example Embodiments

The techniques described herein allow for feedback from the user equipment to be generated and used for guiding user equipment specific beamforming in the azimuth and/or elevation domain by using multiple antenna systems even when existing codebooks not are designed for this purpose.

Figure 6:
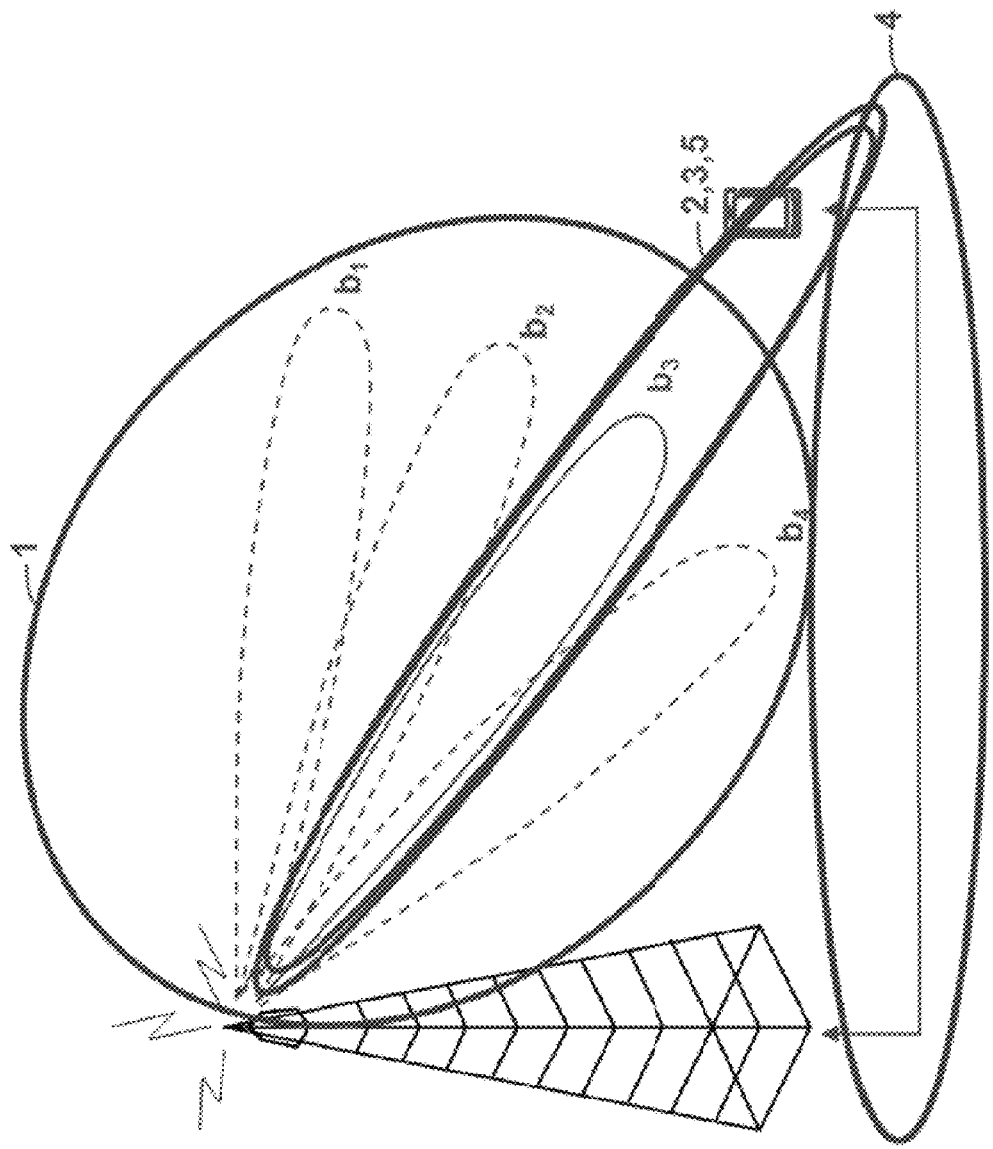
FIG. 6 is an example illustration of message transmission, according to some of the example embodiments.

FIG. 6 provides an example illustration of a general overview of the example embodiments. In FIG. 6 the communications which may be transmitted between an eNodeB and a user equipment are illustrated. It should be appreciated that each of the reference signals $b_n$ may be transmitted in a distinct beamforming direction, however, the transmitted data itself may be overlapping.

As shown in FIG. 6, the eNodeB may first transmit a plurality of CSI-RS, with each CSI-RS being beamformed in a direction within the correlated domain (circle 1). The eNodeB may thereafter determine at least one direction (or beam) within the correlated domain which is likely for a subsequent data transmission to the user equipment (circle 2). The eNodeB may also configure the user equipment to measure CSI (e.g., PMI/RI/CQI) for at least one CSI-RS resource that is beamformed in a direction that is well aligned, or most closely aligned, with the determined direction for the subsequent data (circle 3). Thereafter, the eNodeB may receive CSI (e.g., PMI/RI/CQI) from the user equipment for the transmitted CSI-RS (circle 4). Then, the eNodeB may transmit data to the user equipment by taking the CSI feedback into account.

The example embodiments may be utilized to transmit a plurality of CSI-RS resources, precoded in such a way that each CSI-RS may span a direction within a correlated domain, for example, a correlated vector space, of a multiple antenna system. By configuring a user equipment to measure and report CSI (e.g., PMI/RI/CQI) for, at least one, of the CSI-RS resources that is expected to be particularly aligned (i.e., have a similar direction within a correlated domain) with a subsequent downlink transmission, the eNodeB may ensure that the CSI feedback report is accurate for the transmission (e.g., that the eNodeB can follow the recommended PMI/RI/CQI with only modest changes, to for example the transport format). This will significantly improve the link adaptation. The link adaptation may comprise the selection of the transport block size (e.g., code rate), modulation, precoding, and the transmission rank of the multiple antenna system.

A particularly useful example application of the embodiments presented herein is for the purpose of elevation beamforming, since the elevation direction typically forms a highly correlated domain of an active antenna configuration. Hence, multiple CSI-RS resources are transmitted, with each resource being associated and precoded with a corresponding elevation beam. The eNodeB can thus configure a user equipment to measure and report CSI (e.g., PMI/RI/CQI) for at least one CSI-RS resource that is closely aligned with an expected elevation beam of a subsequent downlink data transmission. For example, the elevation direction where most transmitted power is received by a user equipment. Thereby, the reported CSI is directly applicable in use for the corresponding data transmission that applies the elevation beamformer.

In this section, the example embodiments will be illustrated in more detail by a number of examples. It should be noted that these examples are not mutually exclusive. Components from one example embodiment may be tacitly assumed to be present in another embodiment and a person skilled in the art may use any number of the example embodiments in other example embodiments.

The example embodiments will be presented as follows. First, a description of how a set of CSI-RS signals may be configured to span different elevation directions is provided under the subheading "Generating CSI Feedback for Elevation Beamforming using Multiple CSI-RS". Thereafter, a description on how similar methods may be utilized to generate azimuth beamforming is provided under the subheading "Generating Azimuth Beamforming Feedback from Multiple CSI-RS". A description on how provide joint azimuth and elevation beamforming is provided under the subheading "Generating Joint Azimuth and Elevation Beamforming Feedback from Multiple CSI-RS". Thereafter, generating CSI feedback with the use of CoMP is described under the subheading "Configuration of CSI Feedback using CoMP Measurement Set". The utilization of uplink measurements is discussed under the subheading "Selection of CSI-RS for CSI reporting based on Uplink Measurements". Example embodiments featuring user equipment assistance is provided under the subheading "User Equipment Assisted Selection of CSI-RS for CSI Reporting". Thereafter, an example of CSI-RS selection with the use of signal quality assessments is provided under the subheading "Selection of CSI-RS for CSI Reporting based on CSI-RSRP Reports". Finally, example node configurations and example node operations are provided under the subheadings "Example Node Configuration" and "Example Node Operations", respectively.

Generating CSI Feedback for Elevation Beamforming Using Multiple CSI-RS

According to some of the example embodiments, a set of CSI-RS signals are configured to span different elevation directions. By selecting a candidate elevation beamformer for a data transmission, a corresponding user equipment may be configured to measure and report CSI (e.g., PMI/RI/CQI) for a CSI-RS that is associated with an elevation beam that is most closely aligned with the candidate elevation beamformer.

Consider the case with an $N_A$ Tx active antenna array where each antenna comprises $N_S$ subelements. The beamforming vector for $N_U$ vectors may be represented by:

$$b_u = \begin{bmatrix} b_{1,u} \\ b_{2,u} \\ \vdots \\ b_{N_S,u} \end{bmatrix}, u = 1, \ldots, N_U$$

such that $b_u$ corresponds to a beamforming vector when applied to the subelements of the active antenna in the $N_A$ Tx active antenna array. This will hence correspond to beamforming in the elevation assuming that the subelements are placed vertically, where each $b_u$ typically corresponds to a targeted elevation direction. The beamformer matrixes may be represented by:

$$B_{N_A N_S \times N_A}(u) = \begin{bmatrix} b_u & 0 & \ldots & 0 \\ 0 & b_u & & \vdots \\ \vdots & & \ddots & \\ 0 & \ldots & & b_u \end{bmatrix}, u = 1, \ldots, N_u$$

These matrixes may be used to create the port to subelement mapping which may be represented as:

$$\tilde{x}_{N_A N_S \times 1}(u) = B_{N_A N_S \times N_A}(u) x_{N_A \times 1}(u)$$

where $x_{N_A \times 1}(u)$ is a CSI-RS signal for $N_A$ ports. For the created output vector $\tilde{x}_{N_A N_S \times 1}(u)$ it is assumed that the first $N_S$ values correspond to the subelements of one active antenna and that the second $N_S$ values correspond to the subelements of a second active antenna, etc. Hence, the equation above describes a mapping from the $N_A$ ports CSI-RS to the $N_A N_S$ subelements. Due to the special structure in the beamformer matrixes, each index u corresponds to transmission in a certain direction defined by the beamformers $b_1, \ldots, b_{N_U}$. Typically, the different CSI-RS signals, $x_{N_A \times 1}(u)$, would be configured as to be orthogonal; for example, separated to different time/frequency resources. However, it should be appreciated that the CSI-RS signals may be configured in any other orientation known in the art.

Thus, the eNodeB may be configured to transmit $\tilde{x}_{N_A N_S \times 1}(u)$ for $u=1, \ldots, N_U$. According to some of the example embodiments, some of the user equipments may be configured to measure and report back CSI (e.g., PMI/RI/CQI) for at least one CSI-RS resource that is precoded using an elevation beam that is closely, or most closely, aligned with an expected elevation beam of a subsequent downlink data transmission.

A residual difference between the directional beamformer (e.g., elevation beamformer) used for the data transmission as compared to that used for the configured CSI-RS resource(s), can be compensated by the eNodeB by, for example, an ACK/NACK based outer loop link adaptation in the network.

It should be appreciated that the example embodiments described above and herein may readily be extended to configurations with a different number of subelements in each antenna. Furthermore, it should be appreciated that the concept of a subelement is non-limiting in the sense that it may refer to any virtualization (e.g., linear mapping) of the physical antenna subelements. For example, pairs of physical subelements may be fed by the same signal, and hence share the same virtualized subelement antenna port.

It should further be noted that the terms "beamforming direction" and "beamformer" may be used interchangeably. Such terms should be considered non-limiting and a beamforming direction should be interpreted in the general sense of a complete beamformer vector/matrix, which may have a direction span and a phase. It should be appreciated that according to some of the example embodiments, the structure herein corresponds to each active antenna in the array having the same elevation beam. It is however possible to use a different elevation beam on each active antenna.

Generating Azimuth Beamforming Feedback from Multiple CSI-RS

In the example embodiments presented in the sub-section above, it was presented how to use multiple CSI-RS in order to generate elevation beamforming feedback. The presented method is however not restricted to be applied in the elevation domain and it may readily be extended in other correlated domains; for example, in azimuth. Consider for example deployments with closely spaced cross-polarized linear arrays where the azimuth direction will be highly correlated within each polarization (but uncorrelated between polarizations). For such a deployment a plurality of CSI-RS may be transmitted such that each is precoded in a certain azimuth. For example, to excite a particular azimuth direction, a two port CSI-RS could be used, where one port may be utilized per polarization.

By configuring a user equipment to measure CSI on at least one relevant CSI-RS (e.g., the CSI-RS corresponding to the azimuth direction of the user equipment), the eNodeB may receive the sufficient CSI information for downlink precoding between the two polarizations, whereas the uplink control overhead and the measurement complexity at the user equipment is reduced, since the measurement and reporting is based on a small two port CSI-RS, contrary to state of the art which corresponds to measurement/reporting on a CSI-RS with the same number of ports as the total number of antennas in the array.

Generating Joint Azimuth and Elevation Beamforming Feedback from Multiple CSI-RS It should be appreciated that the example embodiments presented herein may be utilized to jointly cover the azimuth and elevation domain. For example, a set of CSI-RS signals (with a reduced number of ports), each precoded to point in a certain elevation and azimuth direction. By configuring a user equipment to measure CSI on at least one relevant CSI-RS (e.g., the CSI-RS corresponding to the azimuth and elevation direction of the user equipment), the eNodeB can receive the sufficient CSI information for downlink precoding with a minimum of uplink control overhead and user equipment complexity.

Configuration of CSI Feedback Using CoMP Feedback Framework

As of 3GPP Release 11, LTE will have explicit support of CoMP operation. According to some of the example embodiments, in support of CoMP a user equipment may be configured to measure and report CSI (e.g., PMI/RI/CQI) based on multiple CSI-RS resources, corresponding to the CSI-RS resources in a CoMP Measurement Set. More specifically, the UE can be configured with a plurality of CSI Processes for channel state information feedback. Each such CSI process can be configured to represent the channel state of a particular CSI-RS resource of choice, and enables periodic and aperiodic CSI feedback for said CSI-RS resource.

According to some of the example embodiments, a plurality of CSI processes is used to configure a user equipment to measure and report CSI for a plurality of CSI-RS resources that each has been precoded in a certain direction. For example, a user equipment may be configured to feedback CSI for all configured CSI-RS (i.e., for all directions), and thus maximize the flexibility for an eNodeB in selecting a downlink precoder. Alternatively, the user equipment may be configured to measure and report only for a subset of the CSI-RS resources (e.g., corresponding to directions that are most relevant for subsequent downlink data transmission).

Selection of CSI-RS for CSI Reporting Based on Uplink Measurements

Within correlated channel dimensions, there is a strong coupling between uplink and downlink channels (provided by electromagnetic reciprocity). For example, if signals originate from a certain direction in the uplink, the same direction is with high probability also suitable for downlink transmissions.

According to some of the example embodiments, the configuration of which precoded CSI-RS resource(s) a user equipment shall report CSI for is aided by uplink measurements. For example, a user equipment may be configured to report CSI based on measurements on the CSI-RS that is precoded in the direction that most closely aligns with the strongest uplink received direction (or more specifically, the eNodeB determines that the most likely direction of a subsequent data transmission will be well aligned with the uplink measurement, and thus configures the user equipment to report CSI for a corresponding CSI-RS resources).

User Equipment Assisted Selection of CSI-RS for CSI Reporting

According to some of the example embodiments, the user equipment may assist the network in selecting which CSI-RS to use for CSI reporting. When a user equipment performs channel measurements based on a specific CSI-RS resource it will effectively measure the combined effect of the beamforming (applied to the CSI-RS resource) and the effects of the radio propagation channel. Hence, each CSI-RS resource is associated with an effective channel including both the beamforming effect and the radio propagation environment. By letting the user equipment measure the effective channels associated with a plurality of CSI-RS resources, the user equipment may assess the performance of a data transmission over each such effective channel.

The user equipment may thus recommend an effective channel to the network (to use for a subsequent data transmission) based on, for example, selecting effective channel with the highest assessed performance. For example, an index identifying a recommended CSI-RS, among the plurality of CSI-RS resources, may be signaled to the network. Note that there is a one-to-one correspondence between an effective channel and a CSI-RS resource.

Moreover, the user equipment may report CSI only for the recommended CSI-RS resource, thereby reducing overhead, while providing sufficient information to the network to perform accurate link adaptation, beamforming (in e.g., elevation domain) and precoding (in e.g., azimuth domain).

Selection of CSI-RS for CSI Reporting Based on CSI-RSRP Reports

According to some of the example embodiments, the mechanism of CSI-RSRP is used to aid the eNodeB in configuring a user equipment to report CSI for the appropriate CSI-RS resource(s). That is, CSI-RSRP measurement reports are used by the eNodeB to determine likely directions for subsequent downlink data transmissions, and thus which CSI-RS resource to configure a user equipment to perform CSI measurements/reporting on.

According to some of the example embodiments, a user equipment is configured to measure and report CSI-RSRP for at least a subset of the transmitted CSI-RS that are precoded in e.g., elevation domain. By evaluating the reported signal quality levels, the eNodeB may determine a corresponding likely direction for subsequent data transmissions (e.g., elevation beamformer); for example, one potential way to choose the elevation beamformer vector for the subsequent data transmission would be to use the elevation beam corresponding to the best reported signal quality assessment; for example, use the elevation beamformer $b_{u_{max}}$, where $$u_{max} = \mathop{\mathrm{argmax}}_{u}\{RSRP_u\}.$$

According to some of the example embodiments, a different set of CSI-RS resources (here denoted RSRP CSI-RS resources) may be transmitted for the purpose of RSRP feedback. This set of RSRP CSI-RS resources could, however, be partially overlapping with the traditional CSI-RS resources (e.g., the CSI-RS resources discussed for the preceding embodiments that are used for CSI feedback). By applying a directional beamformer on each of the RSRP CSI-RS resources and configuring a user equipment to report corresponding CSI-RSRP values, the eNodeB may derive information about which direction is suitable for downlink data transmission, for example, by applying the above mentioned technique (e.g., choosing the directional beamformer used for the CSI-RS with the highest reported signal quality). The eNodeB may next configure the user equipment to report CSI using the traditional CSI-RS that, for example, is associated with the direction that is most aligned with the determined direction for subsequent data transmissions. For example, by configuring a larger set of RSRP CSI-RS (each typically using a small set of ports and thus having lower overhead) a larger set of directions can be excited thereby achieving a higher resolution for the determined direction for data transmissions, thereby increasing the received signal power and reducing interference to other user equipments.

Example Node Configurations

Figure 7:
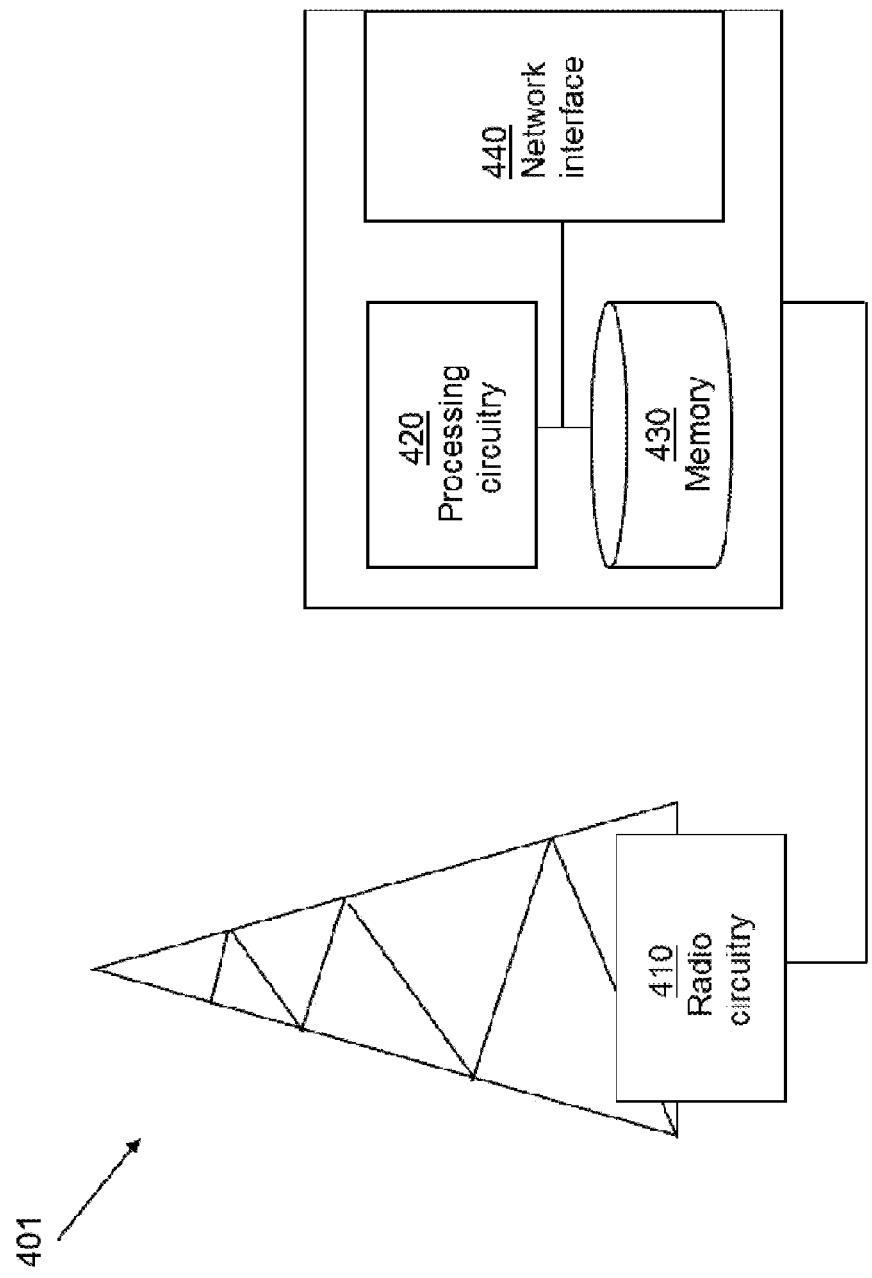
FIG. 7 is an example node configuration of an eNodeB, according to some of the example embodiments.

FIG. 7 illustrates an example of an eNodeB 401 which may incorporate some of the example embodiments discussed above. As shown in FIG. 7, the eNodeB 401 may comprise a radio circuitry 410 configured to receive and transmit any form of communications or control signals within a network. It should be appreciated that the radio circuitry 410 may be comprised as any number of transceiving, receiving, and/or transmitting units or circuitry. It should further be appreciated that the radio circuitry 410 may be in the form of any input/output communications port known in the art. The radio circuitry 410 may comprise RF circuitry and baseband processing circuitry (not shown).

The eNodeB 401 may further comprise at least one memory unit or circuitry 430 that may be in communication with the radio circuitry 410. The memory 430 may be configured to store received or transmitted data and/or executable program instructions. The memory 430 may also be configured to store any form of beamforming information, reference signals, and/or feedback data or information. The memory 430 may be any suitable type of computer readable memory and may be of volatile and/or non-volatile type.

The eNodeB 401 may further comprise further comprises a network interface 440 and processing circuitry 420 which may be configured to generate and analyze reference signals, and generate beamformed communications. The processing circuitry 420 may also be configured to provide configuration instructions to the user equipment. The processing circuitry 420 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 8:
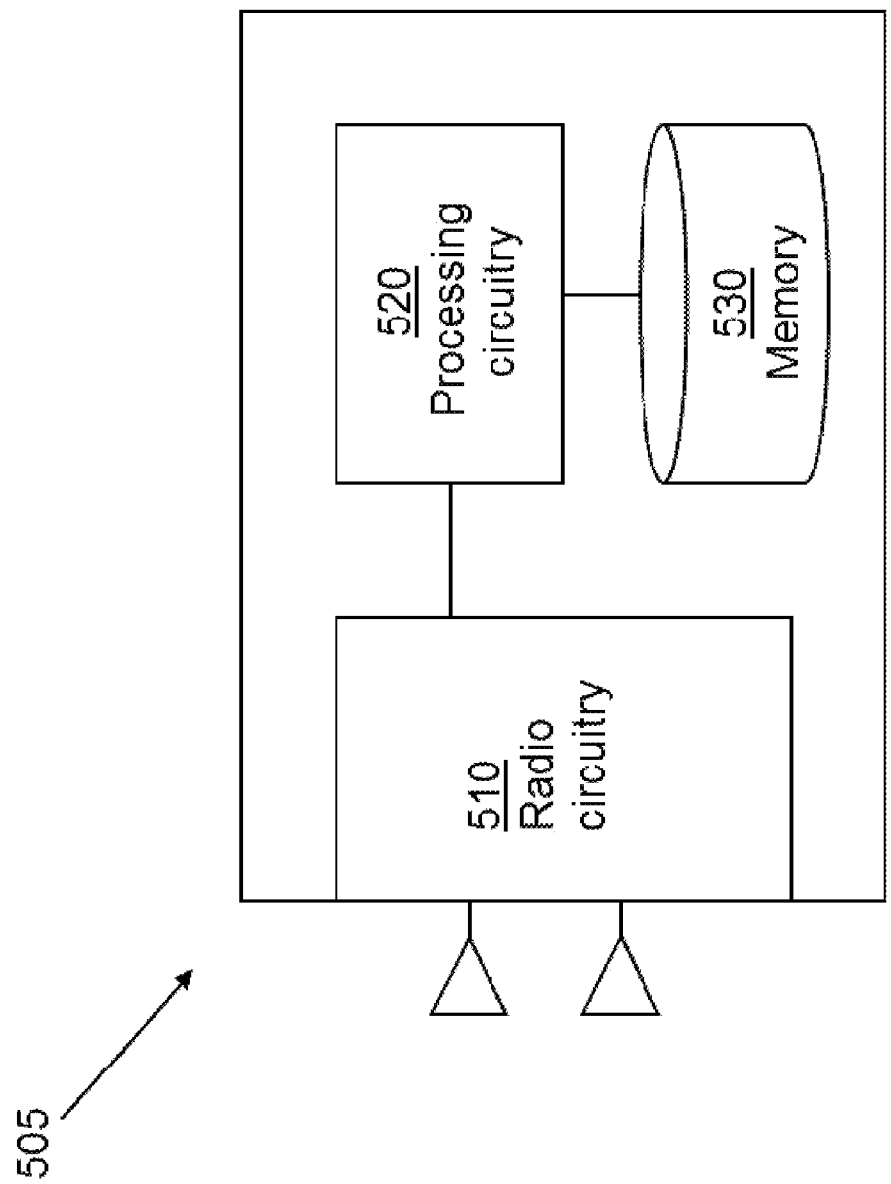
FIG. 8 is an example node configuration of a user equipment, according to some of the example embodiments.

FIG. 8 illustrates an example of a user equipment which may incorporate some of the example embodiments discussed above. As shown in FIG. 8, the user equipment 505 may comprise a radio circuitry 510 configured to receive and transmit any form of communications or control signals within a network. It should be appreciated that the radio circuitry 510 may be comprised as any number of transceiving, receiving, and/or transmitting units or circuitry. It should further be appreciated that the radio circuitry 510 may be in the form of any input/output communications port known in the art. The radio circuitry 510 may comprise RF circuitry and baseband processing circuitry (not shown).

The user equipment 505 may further comprise at least one memory unit or circuitry 530 that may be in communication with the radio circuitry 510. The memory 530 may be configured to store received or transmitted data and/or executable program instructions. The memory 530 may also be configured to store any form of beamforming information, reference signals, and/or feedback data or information. The memory 530 may be any suitable type of computer readable memory and may be of volatile and/or non-volatile type.

The user equipment 505 may further comprise further processing circuitry 520 which may be configured to perform measurements are set configurations provided by the eNodeB. The processing circuitry 520 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Example Node Operations

Figure 9:
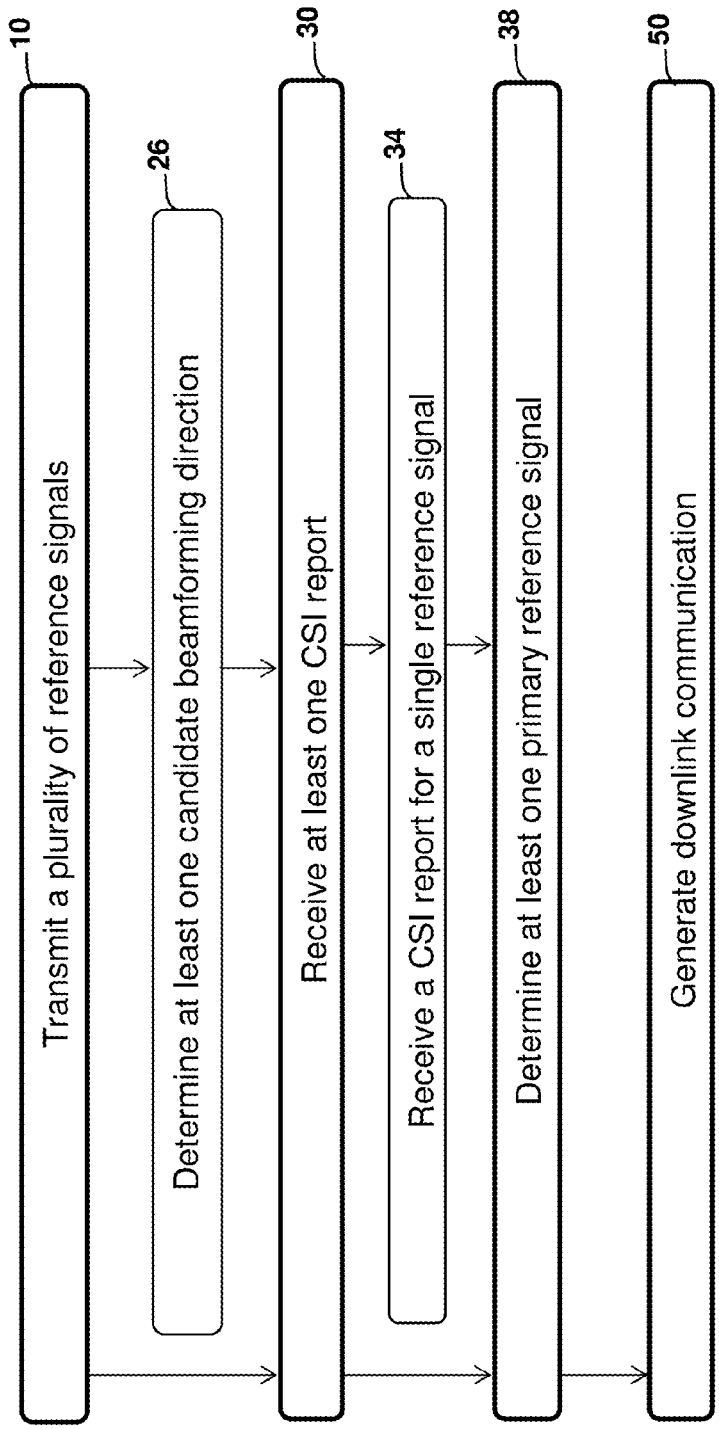
FIGS. 9-11 are flow diagrams of example operations which may be taken by the eNodeB of FIG. 7, according to some of the example embodiments.
Figure 10:
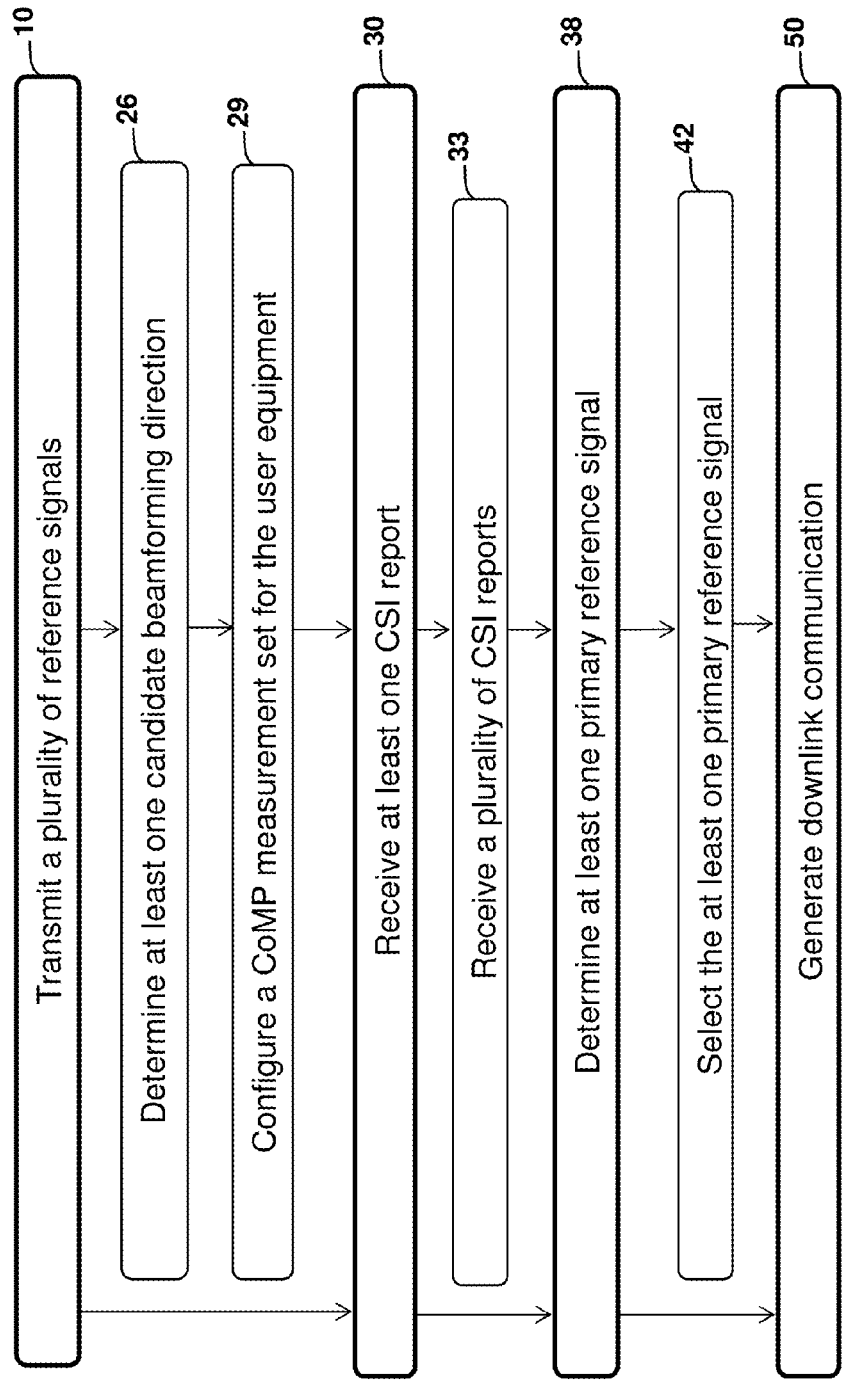
Figure 11:
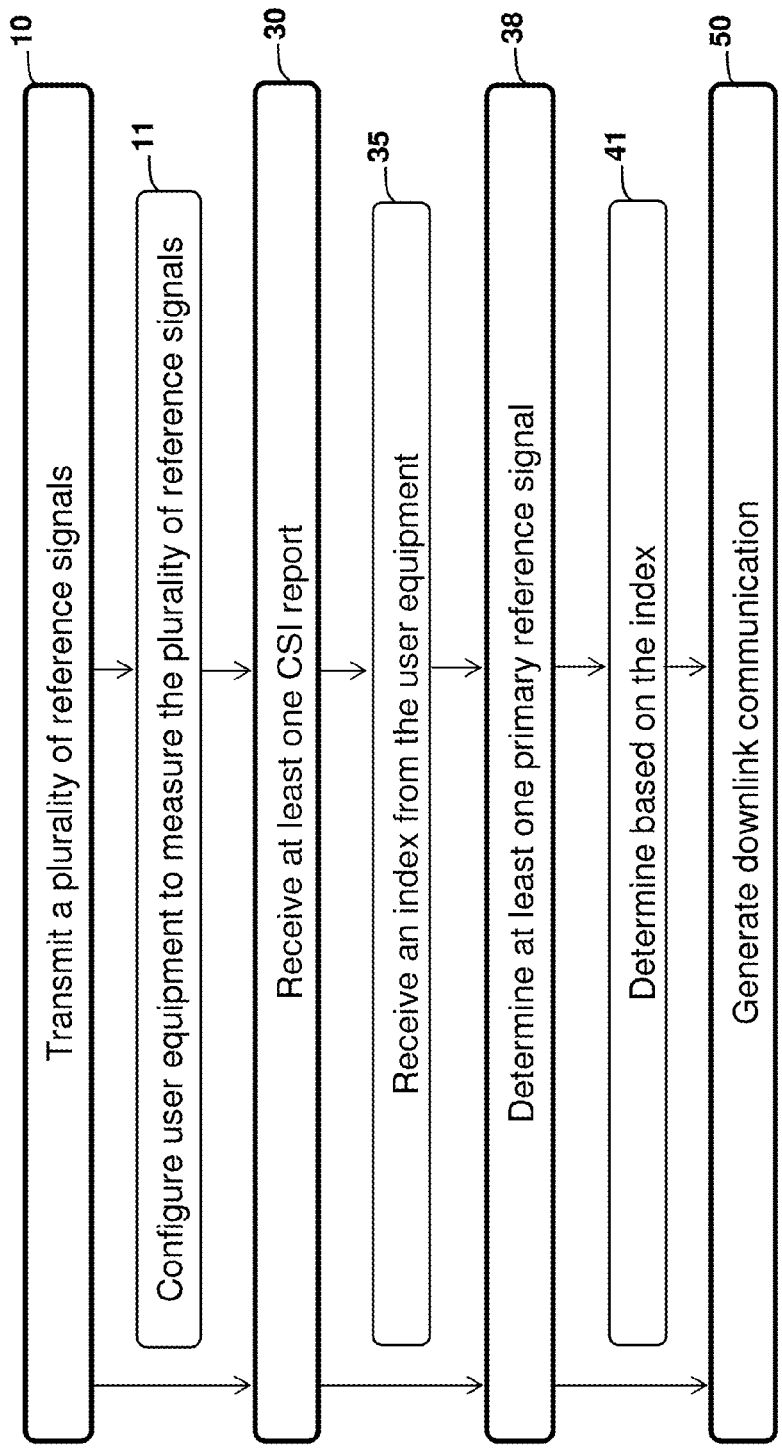

FIGS. 9 through 11 are flow diagrams depicting example operations which may be taken by the eNodeB of FIG. 8, during the generation of downlink communications in a multiple antenna system, according to some of the example embodiments.

It should be appreciated that FIGS. 9-11 comprises some operations which are illustrated with a darker border and some operations which are illustrated with a lighter border. The operations which are comprised in a darker border are operations which are comprised in the broadest example embodiment. The operations which are comprised in a lighter border are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

It should be appreciated that the example operations of FIG. 9 through 11 may be performed simultaneously for any number of user equipments in the wireless communications network. Furthermore, in the example operations described in FIGS. 9 through 11, references are made to signal quality assessments and/or signal quality indicators. Non-limiting examples of such signal quality assessments and/or signal quality indicators may be RSRP, RSRQ and/or RSSI.

FIG. 9 illustrates example eNodeB operations which are described under at least the subheadings "Generating CSI Feedback for Elevation Beamforming using Multiple CSI-RS", "Generating Azimuth Beamforming Feedback from Multiple CSI-RS", "Generating Joint Azimuth and Elevation Beamforming Feedback from Multiple CSI-RS", "Selection of CSI-RS for CSI Reporting based on Uplink Measurements" and "Selection of CSI-RS for CSI Reporting based on CSI-RSRP Reports".

In general, FIG. 9 describes a non-limiting example embodiment in which an eNodeB may first determine an approximate (or candidate) beamforming direction and request or configure the user equipment to provide measurements or a CSI report based on the approximation. A beamforming direction for downlink communications may be provided based on a primary reference signal determined via the CSI report. By first determining the candidate beamforming direction, the amount of user equipment reporting/signaling may be reduced.

Operation 10

The eNodeB is configured to transmit 10, to a plurality of user equipments, a plurality of reference signals. Each reference signal is beamformed into a distinct direction within at least one correlated domain of the multiple antenna system.

The radio circuitry 410 is configured to transmit, to the plurality of user equipments, the plurality of reference signals.

According to some of the example embodiments, the at least one correlated domain may be an elevation and/or an azimuth domain. According to some of the example embodiments, the plurality of reference signals may be CSI-RS.

Example Operation 26

According to some of the example embodiments, the eNodeB may determine 26 at least one candidate beamforming direction, within the at least one correlated domain of the multiple antenna system, for a subsequent data transmission. The processing circuitry 420 may be configured to determine the at least one candidate beamforming direction, within the at least one correlated domain of the multiple antenna system, for a subsequent data transmission.

According to some of the example embodiments, the determining 26 may be provided by transmitting a second set of beamformed reference signals, which may be a subset of, or equal to, the reference signals described in operation 10. The second set of reference signals may be sent prior, after or at the same time as the reference signals referred to in operation 10. According to some of the embodiments, the eNodeB may configure the specific user equipment to report signal quality assessments for the second set of reference signals. According to some of the example embodiments, the reported signal quality assessments of the second set of beamformed reference signals may be utilized to assist in the determination of the candidate beamforming direction.

According to some of the example embodiments, the determining 26 may be provided by transmitting a second set of reference signals beamformed into a distinct direction within at least one correlated domain of the multiple antenna system, which may be a subset of, or equal to, the reference signals described in operation 10. The second set of beamformed reference signals may be sent prior, after or at the same time as the reference signals referred to in operation 10. According to some of the embodiments, the eNodeB may configure the specific user equipment, or there may be a predetermined contract, to report signal quality assessments for the second set of beamformed reference signals. Therefore, the determination of the at least one candidate beamforming direction may be based, at least in part, on a plurality of signal quality assessments received from the specific user equipment. The determined at least one candidate beamforming direction may correspond with a higher signal quality assessments which is favored over directions associated with lower signal quality assessments. The signal quality assessments may be a RSRP, RSRQ and/or a RSSI.

According to some of the example embodiments, the determination of the at least one candidate beamforming direction may be based, at least in part, on uplink measurements on signals transmitted by the user equipment. According to some of the example embodiments, the eNodeB may be configured to estimate the power in a particular direction by applying a beamformer on the received signal. Thus, the eNodeB may perform measurements of the various signals to determine signal energy or power levels received from signals in various directions. According to some of the example embodiments the at least one candidate beamforming direction may be associated with a higher received power that is favored or preferred over a direction associated with a lower received power.

According to some of the example embodiments, upon determining the candidate beamforming direction, the eNodeB may configure the user equipment to report CSI with respect to the reference signals (of operation 10) which are beamformed in a similar manner as the candidate beamforming direction.

Operation 30

The eNodeB is further configured to receive 30, from the specific user equipment, at least one CSI report for the plurality of transmitted reference signals. The radio circuitry 410 is configured to receive, from the specific user equipment, the at least one CSI report for the plurality of transmitted reference signals. According to some of the example embodiments, the CSI report may comprise a PMI, RI and/or at least one CQI.

Example Operation 34

According to the example embodiments illustrated in FIG. 9, the eNodeB is configured to receive 34 a CSI report from the specific user equipment for a single reference signal. The radio circuitry 410 is configured to receive the CSI report. According to some of the example embodiments, the single reference signal may be associated with a signal with a beamforming direction that aligns most closely with the at least one candidate beamforming direction, as compared to any other beamforming direction of any other reference signals of the plurality of reference signals (transmitted in operation 10).

Operation 38

The eNodeB is further configured to determine 38 at least one primary reference signal among the first set of reference signals. The processing circuitry 420 is configured to determine the at least one primary reference signal among the first set of reference signals. In the example provided by FIG. 9, the determined primary reference signal is the single reference signal described in example operation 34.

Operation 50

The eNodeB is further configured to generate 50 downlink communications signals for antenna element(s) and/or sub-elements of the multiple antenna system. The downlink communication signals are beamformed into a transmitting direction that aligns most closely with a beamforming direction of the at least one primary reference signal, as compared to any other beamforming direction of the reference signals comprised in the first set of reference signals. The processing circuitry 420 is configured to generate the downlink communication signals for antenna element(s) and/or subelements of the multiple antenna system.

FIG. 10 illustrates example eNodeB operations which are described under at least the subheadings "Generating CSI Feedback for Elevation Beamforming using Multiple CSI-RS", "Generating Azimuth Beamforming Feedback from Multiple CSI-RS", "Generating Joint Azimuth and Elevation Beamforming Feedback from Multiple CSI-RS" and "Configuration of CSI Feedback using CoMP Measurement Set".

In general, FIG. 10 describes a non-limiting example embodiment in which an eNodeB may configure the user equipment to send measurements or CSI reports on a plurality of reference signals via a CoMP measurement set. It should be appreciated that in this example embodiment, multiple candidate beamforming directions may be determined and each determined candidate beamforming direction may be comprised in the CoMP measurement set. Alternatively, a candidate beamforming direction need not be determined and a beamforming direction for downlink data may be determined via the plurality of CSI reports provided by the user equipment. By providing a large set of reported data, the beamforming direction may be accurately determined.

Operation 10

The eNodeB is configured to transmit 10, to a plurality of user equipments, a plurality of reference signals. Each reference signal is beamformed into a distinct direction within at least one correlated domain of the multiple antenna system. The radio circuitry 410 is configured to transmit, to the plurality of user equipments, the plurality of reference signals.

According to some of the example embodiments, the at least one correlated domain may be an elevation and/or an azimuth domain. According to some of the example embodiments, the plurality of reference signals may be CSI-RS.

Example Operation 26

According to some of the example embodiments, the eNodeB may determine 26 at least one candidate beamforming direction, within the at least one correlated domain of the multiple antenna system, for a subsequent data transmission. The processing circuitry 420 may be configured to determine the at least one candidate beamforming direction, within the at least one correlated domain of the multiple antenna system, for a subsequent data transmission. In the example provided by FIG. 10, the at least one candidate beamforming direction is a plurality (e.g., more than one) candidate beamforming direction.

According to some of the example embodiments, the determining 26 may be provided by transmitting a second set of reference signals beamformed into a distinct direction within at least one correlated domain of the multiple antenna system, which may be a subset of, or equal to, the reference signals described in operation 10. The second set of beamformed reference signals may be sent prior, after or at the same time as the reference signals referred to in operation 10. According to some of the embodiments, the eNodeB may configure the specific user equipment, or there may be a predetermined contract, to report signal quality assessments for the second set of beamformed reference signals. Therefore, the determination of the candidate beamforming directions may be based, at least in part, on a plurality of signal quality assessments received from the specific user equipment. The determined candidate beamforming directions may correspond with a higher signal quality assessments which are favored over directions associated with lower signal quality assessments. The signal quality assessments may be a RSRP, RSRQ and/or a RSSI.

According to some of the example embodiments, the determination of the candidate beamforming directions may be based, at least in part, on uplink measurements received from signals transmitted by the user equipment. According to some of the example embodiments, the eNodeB may be configured to estimate the power in a particular direction by applying a beamformer on the received signal. Thus, the eNodeB may perform measurements of the various signals to determine signal energy or power levels of the received from signals in various directions. According to some of the example embodiments the candidate beamforming directions may be associated with higher received powers that are favored or preferred over directions associated with lower received powers.

According to some of the example embodiments, upon determining the candidate beamforming directions, the eNodeB may configure the user equipment to report CSI with respect to the reference signals (of operation 10) which are beamformed in a similar manner as the candidate beamforming directions, such configuration is explained in example operation 29.

Example Operation 29

According to some of the example embodiments, the eNodeB may configure 29 a plurality of CSI processes and/or a CoMP Measurement Set for a specific user equipment. The CSI processes and/or the CoMP Measurement Set may comprise at least the plurality of reference signals associated with a plurality of CSI reports. The processing circuitry 420 may configure the CoMP Measurement Set for the specific user equipment. According to some of the example embodiments, the CSI processes and/or the CoMP Measurement set may comprise reference signals associated with the determined candidate beamforming directions, as explained in example operation 26.

Operation 30

The eNodeB is further configured to receive 30, from the specific user equipment, at least one CSI report for a first set of reference signals of the plurality of transmitted reference signals. The radio circuitry 410 is configured to receive, from the specific user equipment, the at least one CSI report for the first set of reference signals of the plurality of transmitted reference signals. According to some of the example embodiments, the CSI report may comprise a PMI, RI and/or at least one CQI.

Example Operation 33

According to the example embodiments illustrated in FIG. 10, the receiving 30 may comprise receiving 33 a plurality of CSI reports. The radio circuitry 410 may be configured to receive the plurality of CSI reports. The plurality of CSI reports may correspond to reference signals associated with the CSI processes and/or CoMP Measurement Set as described in example operation 29.

Operation 38

The eNodeB is further configured to determine 38 at least one primary reference signal among the plurality of reference signals. The processing circuitry 420 is configured to determine the at least one primary reference signal among the plurality reference signals.

According to some of the example embodiments, the determining 38 may be based, at least in part, on the plurality of CSI reports. According to some of the example embodiments, the determining 38 may be further based on CQI of the CSI reports. According to some of the example embodiments, the at least one primary reference signal is a reference signal associated with a CSI report with a highest signal quality indicator or a corresponding highest recommended total transmission rate.

Operation 50

The eNodeB is further configured to generate 50 downlink communications signals for antenna element(s) and/or sub-elements of the multiple antenna system. The downlink communication signals are beamformed into a transmitting direction that aligns most closely with a beamforming direction of the at least one primary reference signal, as compared to any other beamforming direction of the reference signals comprised in the first set of reference signals. The processing circuitry 420 is configured to generate the downlink communication signals for antenna element(s) and/or subelements of the multiple antenna system.

FIG. 11 illustrates example eNodeB operations which are described under at least the subheadings "Generating CSI Feedback for Elevation Beamforming using Multiple CSI-RS", "Generating Azimuth Beamforming Feedback from Multiple CSI-RS", "Generating Joint Azimuth and Elevation Beamforming Feedback from Multiple CSI-RS", "User Equipment Assisted Selection of CSI-RS for CSI Reporting" and "Selection of CSI-RS for CSI Reporting based on CSI-RSRP Reports".

In general, FIG. 11 describes a non-limiting example embodiment in which an eNodeB may configure the user equipment to send measurements or a CSI report where the user equipment recommends an effective channel.

Operation 10

The eNodeB is configured to transmit 10, to a plurality of user equipments, a plurality of reference signals. Each reference signal is beamformed into a distinct direction within at least one correlated domain of the multiple antenna system. The radio circuitry 410 is configured to transmit, to the plurality of user equipments, the plurality of reference signals.

According to some of the example embodiments, the at least one correlated domain may be an elevation and/or an azimuth domain. According to some of the example embodiments, the plurality of reference signals may be CSI-RS.

Example Operation 11

According to some of the example embodiments, the eNodeB may configure 11 a specific user equipment to measure the plurality of reference signals and report an index identifying a recommended effective channel among the plurality of effective channels excited by the plurality of reference signals. The processing circuitry 420 may configure the specific user equipment to measure the plurality of reference signals and report the index identifying the recommended effective channel among the plurality of effective channels excited by the plurality of reference signals.

Operation 30

The eNodeB is further configured to receive 30, from the specific user equipment, at least one CSI report for a first set of reference signals of the plurality of transmitted reference signals. The radio circuitry 410 is configured to receive, from the specific user equipment, the at least one CSI report for the first set of reference signals of the plurality of transmitted reference signals. According to some of the example embodiments, the CSI report may comprise a PMI, RI and/or at least one CQI.

Example Operation 35

According to some of the example embodiments, the receiving 30 may further comprise receiving the index from the specific user equipment. The radio circuitry 410 may be configured to receive the index from the specific user equipment. According to some of the example embodiments, the index and the at least one CSI report may be received in a same report from the specific user equipment. The at least one CSI report may represent the identified recommended effective channel.

Operation 38

The eNodeB is further configured to determine 38 at least one primary reference signal among the plurality of reference signals. The processing circuitry 420 is configured to determine the at least one primary reference signal among the plurality of reference signals.

Example Operation 41

According to some of the example embodiments, the determining 38 may further comprise determining 41 the at least one primary reference signal based on the received index. The processing circuitry 420 may be configured to determine the at least one primary reference signal based on the received index.

Operation 50

The eNodeB is further configured to generate 50 downlink communications signals for antenna element(s) and/or sub-elements of the multiple antenna system. The downlink communication signals are beamformed into a transmitting direction that aligns most closely with a beamforming direction of the at least one primary reference signal, as compared to any other beamforming direction of the reference signals comprised in the first set of reference signals. The processing circuitry 420 is configured to generate the downlink communication signals for antenna element(s) and/or subelements of the multiple antenna system.

Figure 12:
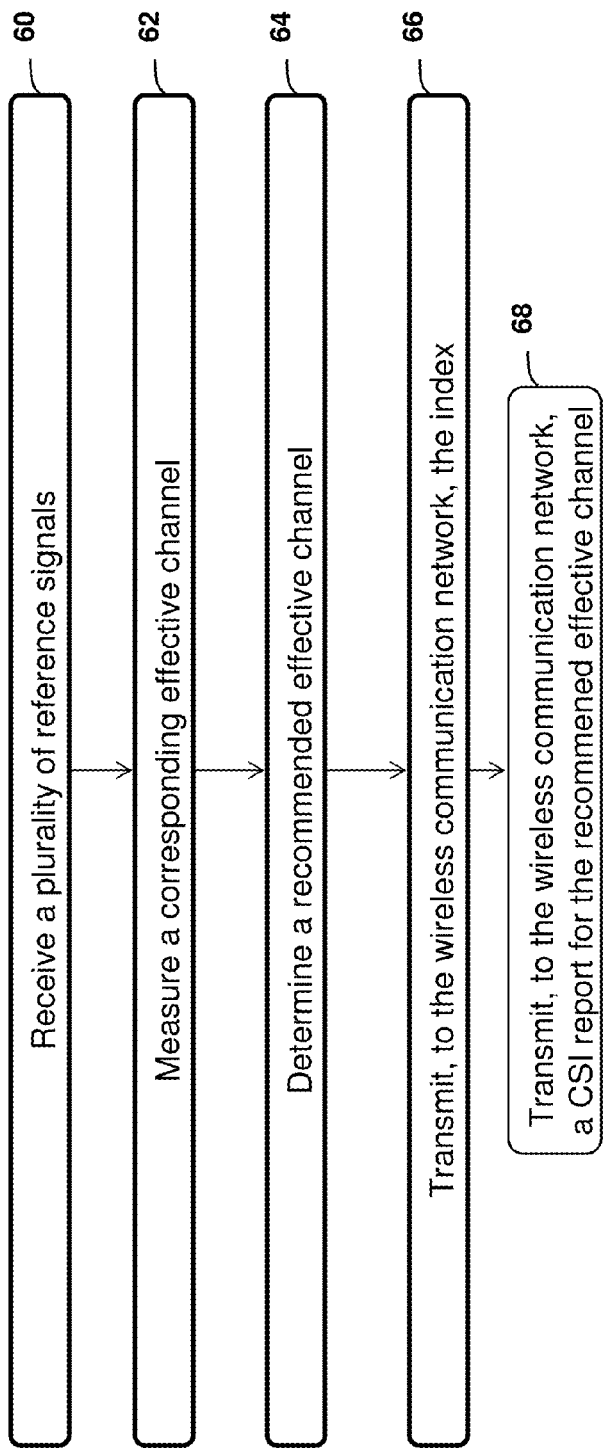
FIG. 12 is a flow diagram of example operations which may be taken by the user equipment of FIG. 8, according to some of the example embodiments.

FIG. 12 illustrates example user equipment operations of the user equipment illustrated in FIG. 8 for the establishing of beamforming in a multiple antenna system. The example operations of FIG. 12 are described under at least the sub-headings "Generating CSI Feedback for Elevation Beamforming using Multiple CSI-RS", "Generating Azimuth Beamforming Feedback from Multiple CSI-RS", "Generating Joint Azimuth and Elevation Beamforming Feedback from Multiple CSI-RS", "User Equipment Assisted Selection of CSI-RS for CSI Reporting" and "Selection of CSI-RS for CSI Reporting based on CSI-RSRP Reports".

It should be appreciated that FIG. 12 comprises some operations which are illustrated with a darker border and some operations which are illustrated with a lighter border. The operations which are comprised in a darker border are operations which are comprised in the broadest example embodiment. The operations which are comprised in a lighter border are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

Operation 60

The user equipment is configured to receive 60, from an eNodeB, a plurality of reference signals. Each reference signal is beamformed into a distinct direction within at least one correlated domain of the multiple antenna system. The radio circuitry 510 is configured to receive, from the eNodeB, the plurality of reference signals. According to some of the example embodiments, the plurality of reference signals is CSI-RS.

Operation 62

The user equipment is further configured to measure 62 a corresponding effective channel for, at least a subset, of the plurality of reference signals. The processing circuitry 520 is configured to measure a corresponding effective channel for, at least a subset of the plurality of reference signals.

Operation 64

The user equipment is further configured to determine 64 a recommended effective channel, among the effective channels, based on a performance metric relating to a performance of a data transmission over a given effective channel. The processing circuitry 520 is configured to determine the recommended effective channel, among the effective channels, based on the performance metric relating to the performance of the data transmission over the given effective channel.

According to some of the example embodiments, the performance metric may be an effective received signal power.

According to some of the example embodiments, the performance metric is an effective data throughput.

Operation 66

The user equipment is further configured to transmit 66, to a wireless communications network, an index identifying the recommended effective channel. The radio circuitry 510 is configured to transmit, to the wireless communications network, the index identifying the recommended communications network.

Example Operation 68

According to some of the example embodiments, user equipment may further transmit 68 a CSI report for the recommended effective channel. The radio circuitry 510 may be configured to transmit the CSI report for the recommended effective channel. According to some of the example embodiments, the CSI report comprises PMI, RI and/or at least one CQI.

It should be appreciated that further example user equipment operations may comprise receiving configuration instructions from the eNodeB. Such configuration instructions may provide information on how to measure and report data comprised in the CSI report, as described herein.

CONCLUSION

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

Also note that terminology such as eNodeB and user equipment should be considered as non-limiting and does in particular not imply a certain hierarchical relation between the two. In general "eNodeB" could be considered as device 1 and "user equipment" as device 2, and these two devices communicate with each other over some radio channel. Furthermore, while the example embodiments focus on wireless transmissions in the downlink, it should be appreciated that the example embodiments are equally applicable in the uplink.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a user equipment, as measuring or recording unit, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method, in an eNodeB, for generating downlink communications in a multiple antenna system, the eNodeB being comprised in a wireless communications network, the method comprising:
   transmitting, to a plurality of user equipments, a plurality of Channel State Information (CSI) reference signals, each reference signal being beamformed into a distinct direction within at least one correlated domain of the multiple antenna system, wherein the at least one correlated domain is an elevation domain;
   receiving, from a specific user equipment, at least one Channel State Information (CSI) report for at least a subset of said plurality of CSI reference signals, wherein the CSI report comprises a Precoder Matrix Indicator, PMI, a Rank Indicator (RI) and at least one signal quality indicator (CQI);
   determining at least one candidate beamforming direction for the specific user equipment, wherein the at least one candidate beamforming direction is based, at least in part, on a signal quality assessment, which comprises a reference signal received power (RSRP), a reference signal received quality (RSRQ), and a received signal strength indicator (RSSI);
   determining, by the eNodeB, at least one primary reference signal among said plurality of reference signals based on the received at least one CSI report; and
   generating downlink communication signals for antenna element(s) and/or sub-elements of the multiple antenna system, wherein the downlink communication signals are beamformed into a transmitting direction that aligns most closely with a beamforming direction of the at least one primary reference signal determined by the eNodeB, as compared to any other beamforming direction of reference signals comprised in the subset of said plurality of CSI reference signals.

2. The method of claim 1, wherein the plurality of Channel State Information CSI reference signals comprise Channel State Information reference symbols.

3. The method of claim 1, the method determines the at least one candidate beamforming direction for the specific user equipment, within said at least one correlated domain of the multiple antenna system, for a subsequent data transmission.

4. The method of claim 3, wherein the determining of at least one candidate beamforming direction is based, at least in part, on uplink measurements on received signals transmitted by the specific user equipment.

5. The method of claim 3, wherein the determining of at least one candidate beamforming direction is based, at least in part, on a plurality of signal quality assessments, received from the specific user equipment, of beamformed signals received by the specific user equipment.

6. The method of claim 3, wherein the receiving further comprises receiving a CSI report for a single reference signal, of said plurality of CSI reference signals, with a beamforming direction that aligns most closely with the at least one candidate beamforming direction, as compared to any other beamforming direction of any other reference signal of said plurality of CSI reference signals.

7. The method of claim 1, wherein the receiving further comprises receiving a plurality of CSI reports for respective reference signals of the plurality of CSI reference signals.

8. The method of claim 7, further comprising configuring a plurality of CSI processes and/or a CoMP Measurement Set for said specific user equipment, the CSI processes and/or the set comprising, at least, the plurality of CSI reference signals associated with said plurality of CSI reports.

9. The method of claim 8, wherein the determining, by the eNodeB, further comprises selecting said at least one primary reference signal from said plurality of CSI reference signals associated with said plurality of CSI reports.

10. The method of claim 3, wherein the at least one primary reference signal is selected such that a beamforming direction of said at least one primary reference signal, aligns most closely with the at least one candidate beamforming direction, as compared to any other beamforming direction of any other reference signal of said plurality of CSI reference signals.

11. The method of claim 6, wherein the determining of at least one candidate beamforming direction is further based on signal quality indicators (CQI) of the at least one CSI report.

12. The method of claim 6, wherein the at least one CSI report is a plurality of CSI reports and the at least one primary reference signal is a reference signal associated with a CSI report with a highest signal quality indicator or a corresponding highest recommended total transmission rate.

13. The method of claim 1, further comprising:
   configuring said specific user equipment to measure said plurality of CSI reference signals, and report an index identifying a recommended effective channel among a plurality of effective channels excited by said plurality of CSI reference signals; and
   receiving said index from said specific user equipment.

14. The method of claim 13, wherein the determining, by the eNodeB, further comprises determining the at least one primary reference signal based on said received index.

15. The method of claim 14, wherein said index and said at least one CSI report are received in a same report from the specific user equipment, and the at least one CSI report represents said identified recommended effective channel.

16. An eNodeB, for generating downlink communications in a multiple antenna system, the eNodeB being comprised in a wireless communications network, the eNodeB comprising:
   a transmitter to transmit, to a plurality of user equipments, a plurality of Channel State Information (CSI) reference signals, each reference signal being beamformed into a distinct direction within at least one correlated domain of the multiple antenna system, wherein the at least one correlated domain is an elevation domain;
   a receiver to receive, from a specific user equipment, at least one Channel State Information (CSI) report for a first set of reference signals of said plurality of transmitted reference signals, wherein the CSI report comprises a Precoder Matrix Indicator (PMI), a Rank Indicator (RI), and at least one signal quality indicator (CQI);
   one or more processors to:
   determine at least one candidate beamforming direction for the specific user equipment, wherein the at least one candidate beamforming direction is based, at least in part, on a signal quality assessment, which comprises a reference signal received power (RSRP), a reference signal received quality (RSRQ), and a received signal strength indicator (RSSI);
   determine, by the eNodeB, at least one primary reference signal among said first set of reference signals; and
   generate downlink communication signals for antenna element(s) and/or sub-elements of the multiple antenna system, wherein the downlink communication signals are beamformed into a beamforming direction, consistent with the at least one candidate beamforming direction, of the at least one primary reference signal determined by the eNodeB, as compared to any other beamforming direction of reference signals comprised in the first set of reference signals.

17. The eNodeB of claim 16, wherein the plurality of Channel State Information (CSI) reference signals comprise Channel State Information Reference Symbols (CSI-RS).

18. The eNodeB of claim 16, wherein the one or more processors determine the at least one candidate beamforming direction within said at least one correlated domain of the multiple antenna system, for a subsequent data transmission.

19. The eNodeB of claim 18, wherein the one or more processors determine the at least one candidate beamforming direction based, at least in part, on uplink measurements on received signals transmitted by the specific user equipment.

20. The eNodeB of claim 18, wherein the one or more processors determine the at least one candidate beamforming direction based, at least in part, on a plurality of signal quality assessments, received from the specific user equipment, of beamformed signals received by the specific user equipment.

21. The eNodeB of claim 18, wherein the one or more processors receive a CSI report for a single reference signal, of said plurality of CSI reference signals, with a beamforming direction that aligns most closely with the at least one candidate beamforming direction, as compared to any other beamforming direction of any other reference signal of said plurality of reference signals.

22. The eNodeB of claim 16, wherein the one or more processors receive a plurality of CSI reports for respective reference signals of the plurality of CSI reference signals.

23. The eNodeB of claim 22, wherein the one or more processors configure a plurality of CSI processes and/or a CoMP Measurement Set for said specific user equipment, the CSI processes and/or the set comprising, at least, the plurality of CSI reference signals associated with said plurality of CSI reports.

24. The eNodeB of claim 23, wherein the one or more processors select said at least one primary reference signal from said plurality of CSI reference signals associated with said plurality of CSI reports.

25. The eNodeB of claim 18, wherein the at least one primary reference signal is selected such that a beamforming direction of said at least one primary reference signal, aligns most closely with the at least one candidate beamforming direction, as compared to any other beamforming direction of any other reference signal of said plurality of reference signals.

26. The eNodeB of claim 21, wherein the one or more processors determine the at least one candidate beamforming direction further based on signal quality indicators (CQI) of the at least one CSI report.

27. The eNodeB of claim 21, wherein the at least one CSI report is a plurality of CSI reports and the at least one primary reference signal is a reference signal associated with a CSI report with a highest signal quality indicator or a corresponding highest recommended total transmission rate.

28. The eNodeB of claim 16, wherein:
the one or more processors configure said specific user equipment to measure said plurality of reference signals, and report an index identifying a recommended effective channel among a plurality of effective channels excited by said plurality of reference signals; and
the receiver receives said index from said specific user equipment.

29. The eNodeB of claim 28, wherein the one or more processors determine the at least one primary reference signal based on said received index.

30. The eNodeB of claim 29, wherein said index and said at least one CSI report are received in a same report from the specific user equipment, and the at least one CSI report represents said identified recommended effective channel.

* * * * *